(12) United States Patent
Pammer et al.

(10) Patent No.: US 7,236,103 B2
(45) Date of Patent: Jun. 26, 2007

(54) INFRARED (IR) COMMUNICATION DEVICE FOR MOTOR VEHICLES

(75) Inventors: Raimund Pammer, St. Josef (AT); Wolfgang Boh, Graz (AT)

(73) Assignee: Efkon AG, Graz (AT)

( * ) Notice: Subject to any disclaimer, the term of this patent is extended or adjusted under 35 U.S.C. 154(b) by 196 days.

(21) Appl. No.: 10/539,297

(22) PCT Filed: Dec. 19, 2003

(86) PCT No.: PCT/AT03/00377

§ 371 (c)(1),
(2), (4) Date: Jun. 16, 2005

(87) PCT Pub. No.: WO2004/057541

PCT Pub. Date: Jul. 8, 2004

(65) Prior Publication Data

US 2006/0115274 A1 Jun. 1, 2006

(30) Foreign Application Priority Data

Dec. 19, 2002 (AT) .................................. 1900/2002

(51) Int. Cl.
*G08G 1/00* (2006.01)
(52) U.S. Cl. ...................... 340/928; 340/942; 701/117; 705/13
(58) Field of Classification Search ................ 340/928, 340/942; 701/117; 348/148, 149; 705/13
See application file for complete search history.

(56) References Cited

U.S. PATENT DOCUMENTS

| | | | |
|---|---|---|---|
| 5,451,758 A * | 9/1995 | Jesadanont | 235/384 |
| 5,781,106 A * | 7/1998 | Liger | 340/505 |
| 5,825,007 A | 10/1998 | Jesadanont | |
| 6,388,581 B1 * | 5/2002 | Barker et al. | 340/928 |
| 6,574,548 B2 * | 6/2003 | DeKock et al. | 701/117 |
| 6,583,732 B1 * | 6/2003 | Bervoets et al. | 340/933 |
| 6,690,293 B2 * | 2/2004 | Amita | 340/928 |
| 7,012,547 B2 * | 3/2006 | Hassett | 340/928 |
| 7,034,715 B2 * | 4/2006 | Gila et al. | 340/928 |

FOREIGN PATENT DOCUMENTS

| | | |
|---|---|---|
| DE | 3 248 544 | 7/1984 |
| DE | 42 39 863 | 4/1993 |
| DE | 43 27 263 | 9/1994 |
| EP | 0 413 948 | 2/1991 |
| EP | 625 767 | 11/1994 |
| WO | WO 01/59711 | 8/2001 |

* cited by examiner

Primary Examiner—Brent A. Swarthout
(74) Attorney, Agent, or Firm—Collard & Roe, P.C.

(57) ABSTRACT

A motor vehicle infrared (IR) communication device (2) for an electronic fee-charging system, comprising IR transmitting and receiving elements (9) arranged in a housing (4) and oriented according to a first direction (10), which first direction (10) extends at least substantially in a vertical longitudinal plane of the motor vehicle when the communication device (2) is in a state installed in a motor vehicle, and transmitting and receiving electronics (36, 37); further IR elements (13) oriented at least according to a second direction (14) are additionally arranged in the housing (4), this second direction (14) being oriented towards a side, relative to the first direction (10), or to the vertical longitudinal plane, respectively.

11 Claims, 5 Drawing Sheets

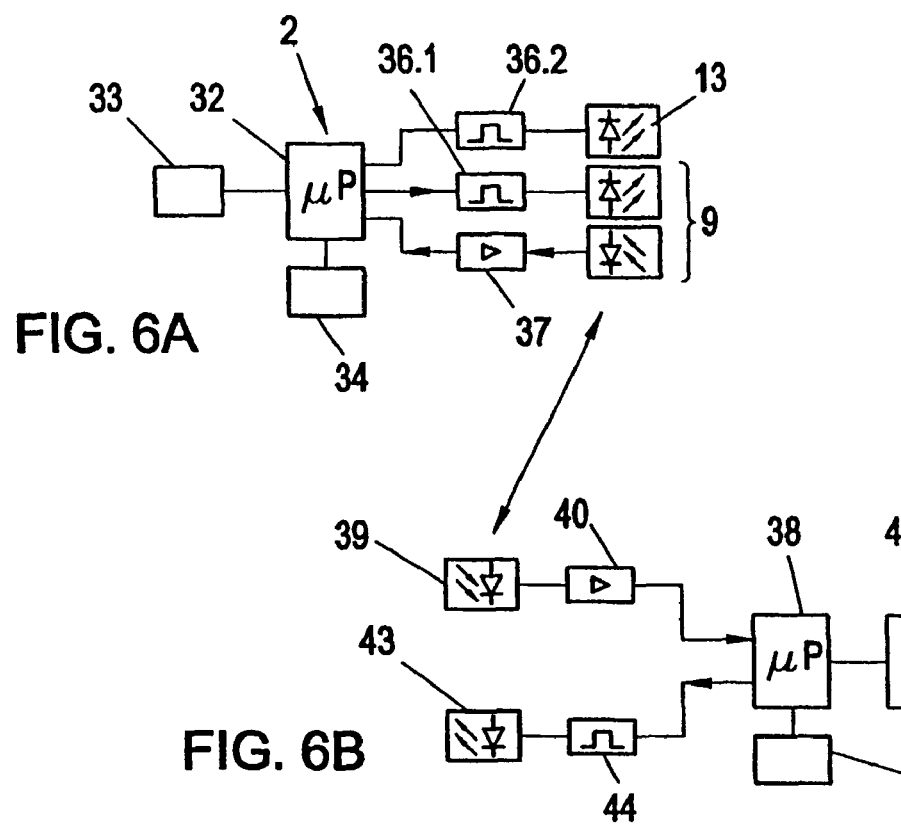
FIG. 6
FIG. 6A
FIG. 6B
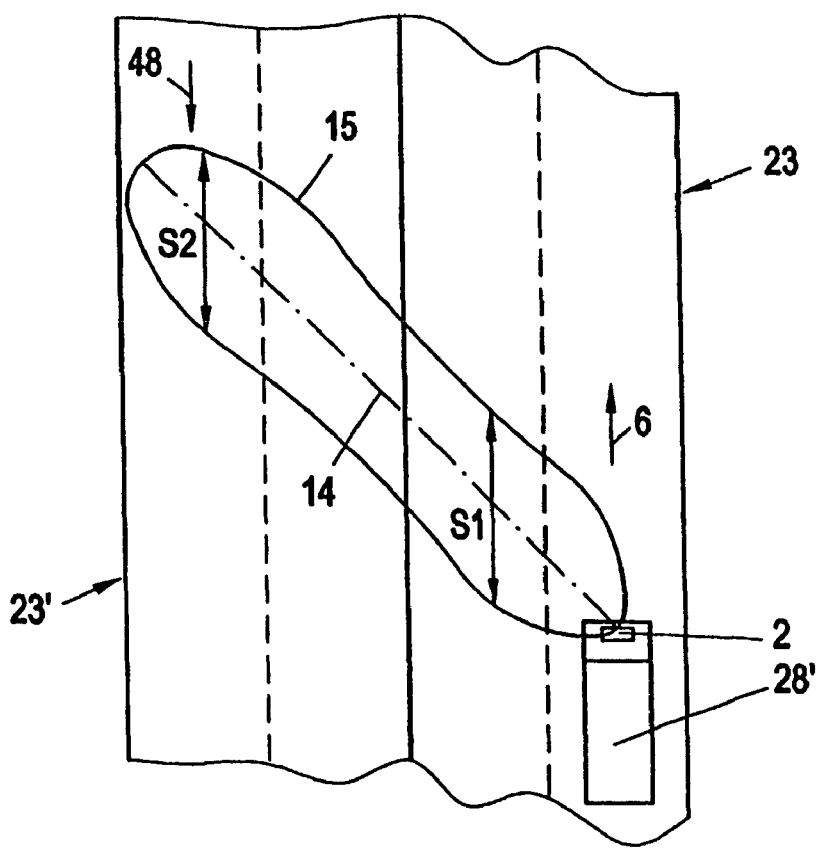
FIG. 7

INFRARED (IR) COMMUNICATION DEVICE FOR MOTOR VEHICLES

CROSS REFERENCE TO RELATED APPLICATIONS

Applicants claim priority under 35 U.S.C. §119 of Austrian Application No. AT 1900/2002 filed on Dec. 19, 2002. Applicants also claim priority under 35 U.S.C. §365 of PCT/AT 2003/000377 filed on Dec. 19, 2003. The international application under PCT article 21(2) was not published in English.

The invention relates to an infrared (IR) communication device for motor vehicles, preferably for an electronic fee charging system, comprising IR transmitting and receiving elements arranged in a housing and oriented according to a first direction, which first direction extends at least substantially in a vertical longitudinal plane of the motor vehicle when the communication device is in a state installed in a motor vehicle, and transmitting and receiving electronics.

Such infrared-based communication devices for motor vehicles, also called "on board units" (OBU in short), are used for electronic tolling systems or also for charging fees in parking places etc., for electronic fee charging systems in general, these OBUs being provided for cooperating with stationary communication devices at the respective traffic area, e.g. in the form of beacons on freeways. Such communication devices or fee charging systems are known from WO 01/59711, e.g. From EP 625 767 A, it is furthermore also known to check motor vehicles equipped with such communication devices from moving checking vehicles (so-called "mobile enforcement") as regards the proper debiting of fees, which debiting is effected via the OBU. In this case it is necessary for the checking vehicle to pass the checked vehicle and to take its place in front of the latter in order to then start through the rear window the IR communication with the checked vehicle and to inquire from this vehicle fee data or a recorded debitings, respectively. If it is found out that no debiting has been recorded or that possibly the checked vehicle lacks an OBU, the checked vehicle can be recorded or stopped immediately so as to record respective vehicle and driver's data.

One problem is, however, that often it will not be possible to take one's place in front of a vehicle to be checked, so that the so-called "mobile enforcement" described will then not be feasible. On the other hand, the communication devices as a rule are adapted for short distances only, e.g. from 5 to 10 m, wherein the angle of radiation and the receiving angle, or generally, the directional characteristic of the transmitting and receiving elements, is relatively narrow so that the described check cannot be carried out in any other way than after passing the vehicle to be checked.

Moreover, since the transmitting and receiving elements of the communication device described are oriented in the driving direction, they cannot be utilized for other purposes, whereas it would often be desirable to allow also for a different communication with the respective vehicle.

It is now an object of the invention to solve these problems and to design the initially described communication device in such a way that other communication possibilities are rendered possible, particularly that also a basis for a mobile enforcement by a checking motor vehicle is efficiently achieved.

To solve this problem, the invention provides for a communication device comprising the features set out in claim 1. Advantageous embodiments and further developments are defined in the sub-claims.

In the communication device according to the invention, it is provided that in addition to a communication in the driving direction, a selective communication is rendered possible also in lateral direction, and this lateral communication may be used for various purposes, in particular for a mobile enforcement by means of checking vehicles passing the vehicle to be checked, but also for a communication e.g. with motor vehicles moving in the opposite direction, for transmitting important traffic information (e.g. to caution them about a traffic jam or a fog zone). This communication in the second direction, the "lateral direction", may be provided such that only on one side of the motor vehicle this further, selective communication is rendered possible, in particular obliquely towards the left front side as seen by the driver in case of right-hand traffic, yet obliquely towards the right front side in case of left-hand traffic. Optionally, this communication can be installed both towards the left and also towards the right, as viewed by the driver of the motor vehicle, and the radiation angles, moreover, can vary within a relatively wide range. With a view to a sufficiently long period of time during which the transmitting and receiving lobes of two vehicles moving in opposite directions will overlap, an oblique orientation is to be preferred over a communication oriented under 90° relative to the driving direction.

It has proved to be particularly suitable if as further IR elements oriented in the second direction, only IR transmitting elements are provided and if for the IR receiving elements oriented in the first direction, a directional characteristic which is sufficiently wide also for receiving in the lateral direction is provided. Since the IR transmitting elements require relatively much electric energy in comparison with receiving elements, an energy-efficient, selective communication will be ensured in this manner by means of a few infrared transmitting elements, while on the other hand, due to the narrow directional characteristics of the respective transmitting elements, also the selectivity of the communication in both directions will not be adversely affected when mutually shared IR receiving elements having a correspondingly wider directional characteristic are employed for the communication in the driving direction as well as in the lateral direction. In this case it has also been shown to be suitable if the directional characteristic of the IR receiving elements oriented in the first direction has a half value angle of from ±50° to ±75°, preferably approximately ±60°.

For the lateral communication, in particular for an exchange of information with oncoming vehicles, ideally a directional characteristic would have to be sought which has the shape of a parallelogram seen in top view, so as to ensure approximately constant lengths of paths for the communication of the two vehicles in the driving direction and in the counter-driving direction. Such a directional characteristic can very well be approximated in a simple manner in that the IR elements oriented in the second direction partly comprise a first, narrower far field directional characteristic and for at least one other part comprise a second, wider near field directional characteristic overlapping the first directional characteristic. In this respect it is furthermore advantageously provided that the at least two overlapping directional characteristics overlap each other in a pre-determined mixing ratio, e.g. of approximately 2:1, the mixing ratio being determined by the respective number of IR elements and/or by the pre-determined amount of the current flowing therethrough. Here, preferably, the narrower far field directional characteristic has a half-value angle of approximately ±10°, whereas the wider near field directional characteristic preferably has a half-value angle of approximately ±20°.

As has already been mentioned, preferably an oblique orientation is to be provided for the second direction, and it has proved to be particularly advantageous if the second direction encloses an azimuth angle with the vertical longitudinal plane of from 35° to 55°, preferably approximately 45°. As has already been mentioned, preferably one and the same IR receiving elements are used for the communication in the direction straight ahead as well as in the lateral direction. If the present communication device then is merely used in electronic tolling or fee charging systems, e.g., wherein optionally also a check by a laterally passing or overtaking motor vehicle is rendered possible, the two communications may simply merge in one and the same receiving electronics and the data processing means connected thereto. If, however, a communication with other vehicles shall be rendered possible for an exchange of, e.g., traffic information, provisions must be taken in view of the mutually shared receiving elements and receiving electronics that the information or data received will be separately further processed according to type, and in a further development of the invention it is therefore preferably provided that a data discriminator detecting the type of received data is connected to the receiving electronics, to which different data processing circuits are connected to which the respective data are supplied in dependence on the data type detection. Since, furthermore, only a short period of time in the order of from one to three tenths of a second is available for such an information exchange between vehicles which meet, and, moreover, special efforts must not be required for the transmission of information which would require the driver's concentration, it is suitable to store certain information beforehand and to retrieve it by means of codes. Then it will preferably be further provided that a memory for pre-determined messages is associated to a data processing circuit and that data transmitted in the second direction, or received from the second direction, respectively, and supplied by the receiving electronics to the data processing circuit comprise address information for reading out the respective messages from the memory. The messages read out of the memory may then be optically reproduced on a display, or they may be reproduced acoustically.

As also has already been mentioned before, the communication device according to the invention may advantageously also be employed for a check by mobile checking units, i.e. motorized checking vehicles, and for this instance, it is particularly provided that a data processing circuit is associated to a fee charging unit as well as connected to the transmission electronics for returning data relating to fees charged in the second direction.

In the following, the invention will be explained in more detail by way of preferred exemplary embodiments, to which, however, it shall not be restricted.

Figure 3:
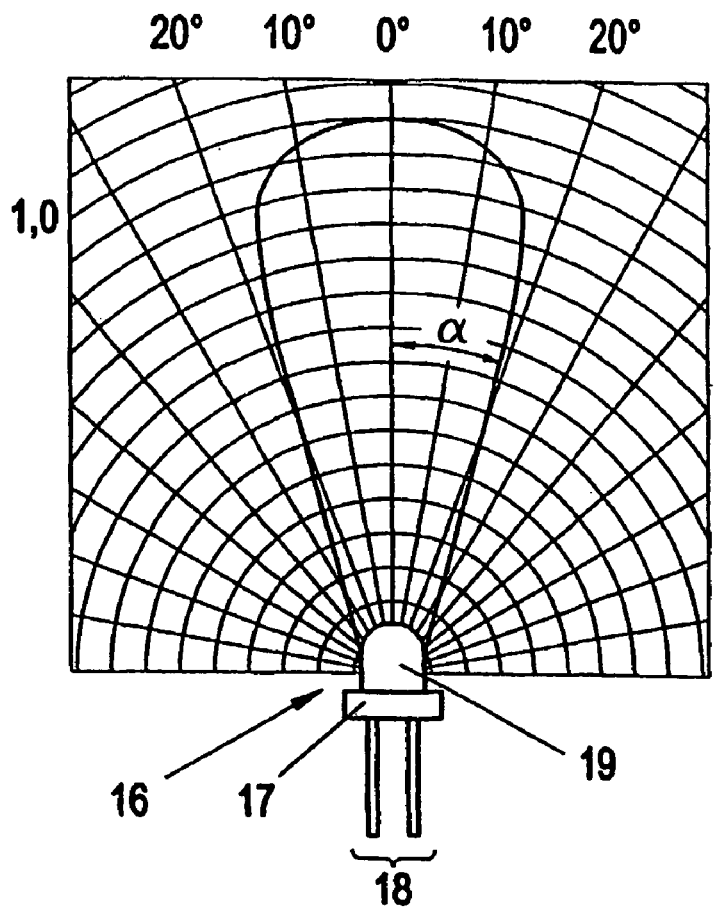
Figure 4:
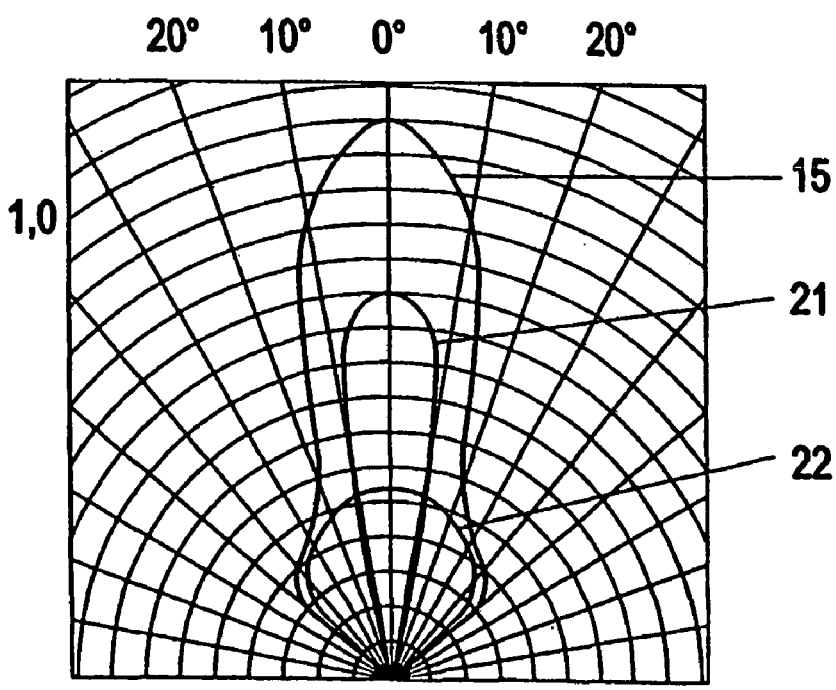
Figure 5:
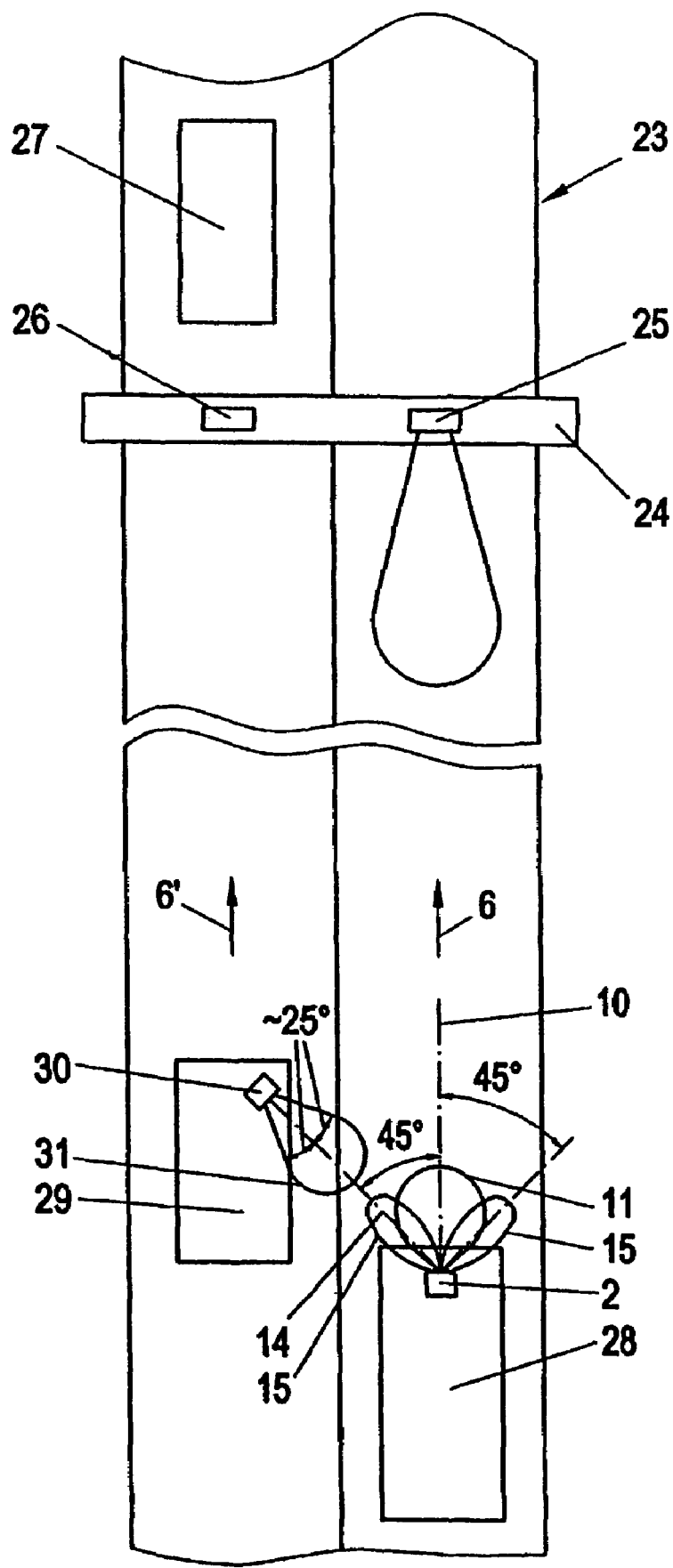
Figure 8:
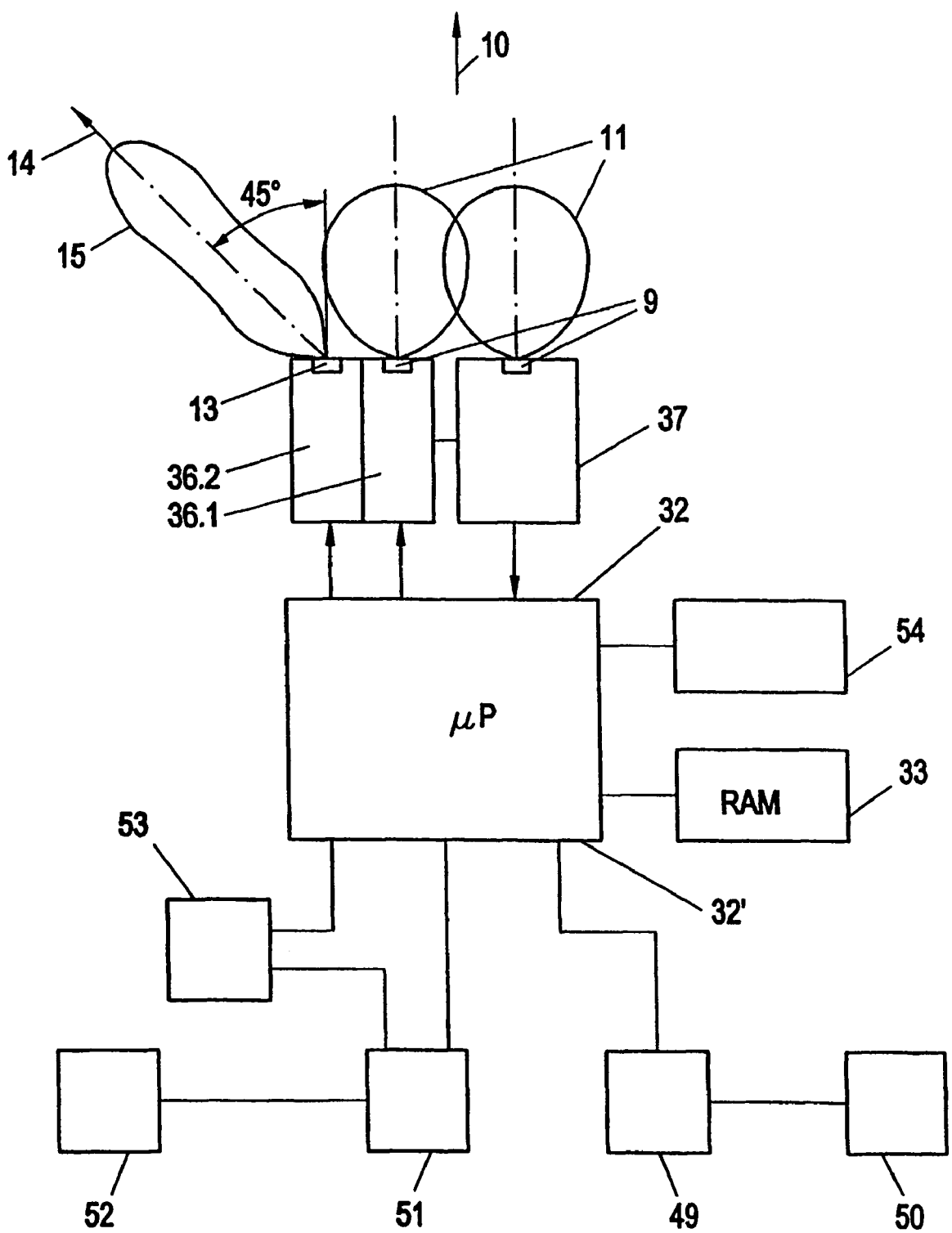

FIG. 3 schematically shows an IR transmitting element on a chip with the associated transmission lobe, or directional characteristic, respectively;

FIG. 4 shows a directional characteristic composed of two transmission lobes of two IR transmitting elements or two groups of transmitting elements, i.e. with a near field directional characteristic and with a narrower far field directional characteristic;

FIG. 5 in a quite schematic top view shows the use of a communication device according to the invention for the purpose of a check by a passing checking motor vehicle;

FIG. 6 in partial FIGS. 6A and 6B shows associated block diagrams for the transmitting and receiving devices in the checked vehicle (FIG. 6A) as well as in the checking vehicle (FIG. 6B);

FIG. 7, in a schematic top view comparable to FIG. 5, shows a motor vehicle with a communication device according to the invention for a communication in the second, lateral direction with a vehicle moving in the opposite direction which is merely indicated by an arrow, with a directional characteristic comparable to that according to FIG. 4; and FIG. 8 shows a block diagram of a communication device according to the invention, which is adapted both for the usual exchange of fee information and for debiting fees and also for a data exchange with oncoming vehicles.

Figure 1:
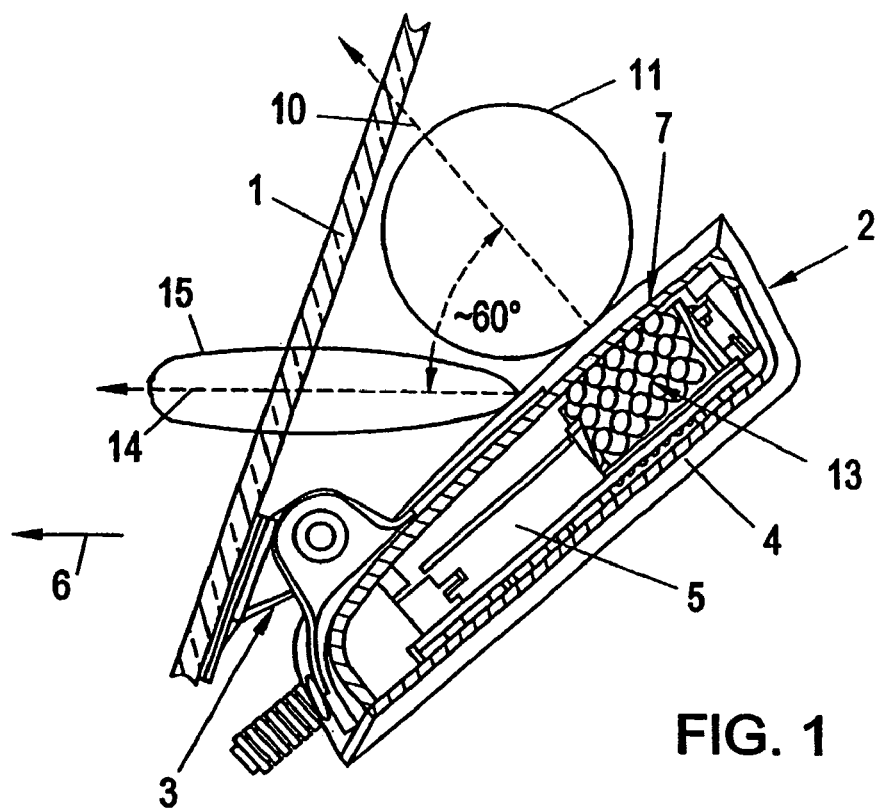
FIG. 1 shows a schematic, partially sectioned perspective view of an infrared communication device which is mounted on a partially illustrated windshield of a motor vehicle, wherein schematically and not true to scale also a transmission lobe for a lateral communication as well as a transmission and receiving lobe for a communication in driving direction are entered on a reduced scale.

According to FIG. 1, an infrared (IR) communication device 2 in the form of a so-called "on board unit" (in the following called OBU in short) is attached by means of a mounting base 3 to a windshield 1 of a vehicle not further illustrated. The OBU 2 has a housing 4 in the interior of which the required electronic circuit 5 is arranged which, however, is not further illustrated in FIG. 1—and, likewise, neither in FIG. 2—and which may be designed in a per se conventional manner. According to the illustrations in FIG. 1 and also in FIG. 2, the driving direction is towards the left, cf. also the respective arrows 6.

Figure 2:
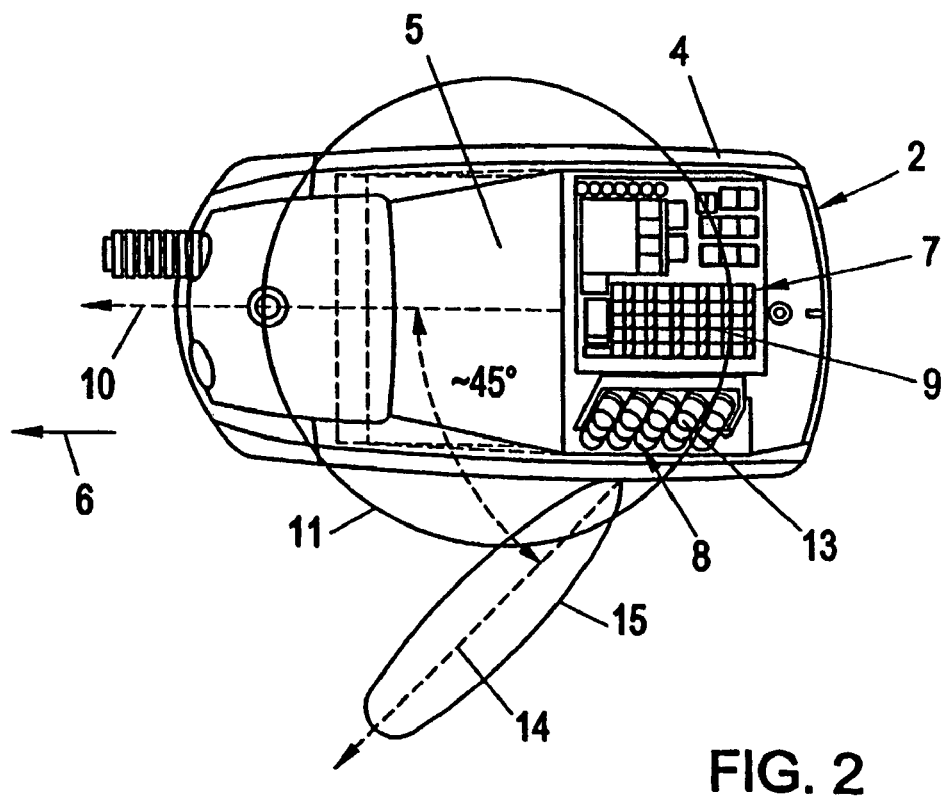
FIG. 2 shows a top view onto this communication device, without windshield, a side lobe for the communication in the second, lateral direction being illustrated.

In the housing 4, behind transparent windows 7 and 8, respectively, arrays of IR elements are provided, i.e., in detail, on the broadside of the device 2 facing forwards, an array 9 of IR transmitting and receiving elements, cf. FIG. 2, which are oriented in a first direction 10 as regards radiation and reception; this first direction 10 (cf. particularly FIG. 1) extends obliquely upwards, under an inclination of e.g. approximately 45° or 55° relative to the horizontal line, and in a vertical plane parallel to the driving direction 6 or also to the longitudinal axis of the motor vehicle not further illustrated. In this first direction 10, the IR transmitting and receiving elements each have a relatively wide directional characteristic 11, both in vertical direction (FIG. 1) and also in horizontal direction (FIG. 2), e.g. with a respective half-value angle of ±60°.

The second array of IR elements 13 is located laterally in the housing 4 of OBU 2, these elements preferably being mere IR transmitting elements which are oriented in a second direction 14 obliquely forwards and towards the side, relative to the driving direction 6. As is visible from FIG. 1, this second direction 14 preferably extends approximately horizontally, if the associated motor vehicle is standing or moving on a plane traffic surface. The angle which the second direction 14 encloses with the first direction 10, seen in top view (cf. FIG. 2), or with a vertical plane laid through the first direction 10, in the driving direction 6, amounts to approximately 45°, e.g. In FIGS. 1 and 2, moreover, the narrower directional characteristic 15 associated with these laterally oriented IR transmitting elements 13 is shown, this directional characteristic 15, as will be explained in more detail by way of FIG. 4 hereinafter, preferably being composed of two transmitting lobes or directional characteristics by the array of IR transmitting elements 13 being realized by two groups of IR transmitting elements, one group of which defining a narrower far field directional characteristic and the other one defining a near field directional characteristic which, compared to the former one, is somewhat wider.

In FIG. 3, an IR transmitting element 16 having the form of a light-emitting diode (LED) 16 is shown, a transparent plastics housing 19 being mounted on a chip (i.e. an integrated circuit) 17 that comprises the light-emitting diode proper and which is provided with terminals 18, the plastics housing 19 acting as a lens and having a diameter of from 3 mm to 5 mm, e.g. Depending on the distance of the chip 17 from the focus of the lens defined by the housing 19, different transmission lobes 20 will result having defined half-value angles α. According to FIG. 3, the half-value angle α of the transmission lobe or directional characteristic 20 will be approximately ±20°, e.g. Now, if as suggested before, the IR transmitting elements 16 are overlapping with different transmission lobes 20, having different half-value angles α and different ranges, a combined directional characteristic 15 approximately of the form as shown in FIG. 4 may be obtained with which an approximately parallelogram-type shape (cf. FIG. 7) as regards the length of path in the driving direction can be obtained.

In detail, according to FIG. 4—and not true to scale—a narrower far field directional characteristic 21 overlaps a wider near field directional characteristic 22 so as to obtain the combined directional characteristic 15. The half-value angle for the two directional characteristics 21, 22 are, e.g., approximately ±10° and approximately ±20°, respectively. To generate the far field and the near field, respectively, a certain mixing ratio is required which can be adjusted by the respective number of diodes, i.e. IR transmitting elements 13, and/or by the circuit-determined transmission current through the diodes, as is known per se and need not be further explained here. In this way, two approximately equal, constant communication paths S1 and S2 (cf. FIG. 7) can be obtained by means of the combined directional characteristic 15.

In FIG. 5, a two-lane roadway 23 is quite schematically shown in a top view, and this roadway is equipped with a conventional stationary overhead toll unit 24 comprising stationary communication devices 25, 26 for a selective communication with vehicles 27, 28 moving in the lanes. These stationary communication devices, 25, e.g., will communicate in detail selectively with the respective OBU 2, e.g. in vehicle 28, for debiting tolls, with those IR transmitting and receiving elements 9 of OBU 2 here being in operation which are oriented in the first direction 10, corresponding to a vertical plane through the driving direction 6. This data exchange between stationary and mobile communication device for the purpose of electronic toll collection is known per se and need not be further explained here.

From FIG. 5 it may furthermore be seen that on at least one side of the vehicle 28, i.e. obliquely towards the front, in the second direction 14, a transmission lobe 15 is given which is determined by the OBU 2 or, more precisely, by the second IR transmission element 13 of the latter, to thus communicate with a passing checking vehicle 29 which contains a comparable communication device 30 which is oriented under an appropriate angle, e.g. 135° relative to the driving direction 6' as regards transmission and receiving characteristics, cf. the directional characteristic 31 having a half-value angle of approximately ±25° in FIG. 5. In this manner, the checking vehicle 29 can inquire in the OBU 2 of the checked vehicle 28 data regarding the recorded debitings or payments of tolls as well as data regarding the owner of the vehicle. This may be effected in a simple manner by driving side by side or during the passing procedure, and it is not necessary for the checking vehicle 29 to get into the position directly in front of the checked vehicle 28 after having changed lanes.

In FIG. 6, this data exchange between the vehicles 28 and 29 is schematically illustrated by showing block diagrams of the respective communication devices 2 (FIG. 6A) and 30 (FIG. 6B). The OBU 2 of the checked vehicle 28 contains, e.g., a microprocessor 32 in a per se conventional manner (cf. FIG. 6A), which has an associated memory 33 as well as a "fee card" 34, and which controls two separate transmission electronics components 36.1 (for transmission in the first direction 10, by means of the first IR transmitting elements in array 9), as well as second transmission electronics 36.2 (for transmitting in the second direction 14, by means of the IR transmitting elements 13 of the second array). For a communication in both directions 10, 14, the mutually shared IR receiving elements in the first array 9 are employed, and the output signals thereof are processed in an amplifying and pulse-forming stage 37 for an application to the microprocessor 32.

In a comparable manner, in the communication device 30 of the checking vehicle 29 (cf. FIG. 6B), a microprocessor 38 is contained as a central controlling and data processing component, to which the IR signals received via IR receiving diodes or, generally, IR receiving elements 39 are supplied after an appropriate amplification and pulse formation in an amplifier and pulse forming component 40. The microprocessor 38 furthermore has an associated controlling and inputting unit 41 as well as a memory 42. Moreover, it is visible in FIG. 6B that with an appropriate input via the inputting unit 41, the microprocessor 38 controls IR transmitting elements having the form of LEDs 43 via associated transmitting electronics 44. In a checking procedure, this is done initially so as to "wake up" OBU 2 in the checked vehicle 28 and then question it, i.e. invite it to transmit pre-determined recorded booked data. These booked data will then be read out by the microprocessor 38 in OBU 2 from the memory 32 and transmitted via the transmission electronics 36.2 and the IR transmitting elements 13 as well as received by the communication device 30 via its receiving elements 43.

In FIG. 7, a further possible application of the present communication device 2 is schematically illustrated. Again, a motor vehicle 28' equipped with such a communication device, or OBU 2, respectively, moves in a driving direction 6, e.g., in the right-hand lane of a roadway 23 of a freeway. On the counter-direction roadway 23', e.g. a vehicle 48 indicated merely by an arrow moves, i.e. in the opposite lane, also in the right lane thereof. In FIG. 7, also the combined directional characteristic 15 for vehicle 28' is schematically illustrated (cf. the previous discussion regarding FIG. 4), it being visible that approximately constant lengths of paths S1, S2 are covered by the combined directional characteristic 15 for the two vehicles 28' and 48 so as to adequately accomplish the communication in the driving direction and the counter driving direction, respectively. This also applies if the two vehicles 28', 48 each move in the respective left-hand lane.

In FIG. 8, corresponding to FIG. 6A, the microprocessor 32 including the RAM memory 33 connected thereto as well as the transmission and receiving electronics 36.1, 36.2 and 37 (cf. also FIG. 7) are illustrated as components for OBU 2. They have associated IR element arrays 9 and 13, respectively, which are oriented in the first direction 10 and in the second direction 14, respectively, cf. the corresponding transmission and receiving lobes 11 in the first direction 10 and the transmission lobe 15 in the second direction 14, respectively. The receiving lobe 11 is adapted to be able to receive also signals coming from the direction which is contrary to the second direction 14, i.e. the corresponding IR receiving elements of the first array 9 are provided with an appropriately wide directional characteristic.

If used also for an exchange of information other than for fee charging purposes, as indicated in FIG. 7, the signals or data received via the IR receiving elements 9 and the receiving electronics 37 must be distinguished and separated, which can be carried out at microprocessor 32 simply on the basis of the type of data supplied—the microprocessor 32 thus also forms a data discriminator 32' so as to transmit the received data depending on their type either to a first data processing circuit 49 for the fee module merely schematically shown in FIG. 8 by a block 50, or to supply the data received at an exchange of information with the oncoming vehicle 48 to a second data processing circuit 51 which supplies appropriate messages to a reproduction unit 52. Preferably, a certain number of pre-defined messages, such as "Fog ahead", "Accident ahead" or "Traffic jam ahead" etc. are kept stored in a memory 53, the received data containing address information for retrieving the respective messages from the memory 53 to be reproduced via the reproduction unit 52. The reproduction unit 52 may simply be a display, i.e. an optic reproduction unit, yet thereinstead or in addition thereto also an acoustic reproduction unit may be provided, in which case the messages stored in memory 53 will contain appropriate (additional) voice information.

For the sake of completeness, in FIG. 8 also a program memory 54 for the microprocessor 32 is illustrated.

When in FIG. 7 the second direction 14 is illustrated to extend obliquely towards the left front side, this is not to be considered as restrictive, since in countries with left-hand traffic an inverted mirror-type arrangement with the second direction 14 extending obliquely laterally towards the right instead of towards the left, would have to be provided. In particular, the communication device 2 may right from the start be provided with a middle array 9 of infrared transmitting and receiving elements as well as with two lateral IR elements 13, namely for a lateral radiation towards the left, and for a lateral radiation towards the right. Depending on the respective country in which the communication device, or OBU 2, respectively, will then be mounted, either one or the other lateral IR element group 13 can be activated.

The invention claimed is:

1. A motor vehicle infrared (IR) communication device (2) preferably for an electronic fee-charging system, comprising IR transmitting and receiving elements (9) arranged in a housing (4) and oriented according to a first direction (10), which first direction extends at least substantially in the travel direction of the motor vehicle when the communication device (2) is in a state installed in a motor vehicle, and comprising further IR elements (13) additionally arranged in the housing (4) and oriented at least according to a second direction (14), this second direction (14) being oriented towards one side, relative to the first direction (10), and transmitting and receiving electronics (36, 37), wherein, as further IR elements (13) oriented in the second direction (14), only IR transmitting elements are provided, and in that for the IR receiving elements (9) oriented in the first direction (10), a directional characteristic (11) which is sufficiently broad also for receiving in the lateral direction is provided.

2. A communication device according to claim 1, wherein the directional characteristic (11) of the IR receiving elements (9) oriented in the first direction has a half value angle of from ±50° to ±75°, preferably approximately ±60°.

3. A communication device according to claim 1, wherein the IR elements (13) oriented in the second direction (14) partly comprise a first, narrower far field directional characteristic (21) and for at least one other part comprise a second, wider near field directional characteristic (22) overlapping the first directional characteristic.

4. A communication device according to claim 3, wherein the at least two overlapping directional characteristics (21, 22) overlap each other in a pre-determined mixing ratio, of approximately 2:1, the mixing ratio being determined by at least one of the respective number of IR elements (13) or the pre-determined amount of the current flowing therethrough.

5. A communication device according to claim 3, wherein the narrower far field directional characteristic (21) has a half-value angle of approximately ±10°.

6. A communication device according to claim 3, wherein the wider near field directional characteristic (22) has a half-value angle of approximately ±20°.

7. A communication device according to claim 1, wherein the second direction (14) defines an azimuth angle with the first direction, seen in top view, of from 35° to 55° preferably approximately 45°.

8. A communication device according to claim 1, wherein a data discriminator (32') determining the type of received data is connected to the receiving electronics (37), to which different data processing circuits (49, 51) are connected to which the respective data are supplied in dependence on the data type determination.

9. A communication device according to claim 1, wherein a memory (53) for predetermined messages is associated to a data processing circuit (51) and in that data transmitted in the second direction (14) from a different motor vehicle communication device, received via the IR receiving elements (9) and supplied by the receiving electronics (37) to the data processing circuit (51) comprise address information for reading out the respective messages from the memory (53).

10. A communication device according to claim 9, comprising at least one of an optic or acoustic reproduction unit (52) for the messages.

11. A communication device according to claim 1, wherein a data processing circuit (49) is associated to a fee charging unit (50) as well as connected to the transmission electronics (36.1) for returning data relating to fees charged in the second direction (14).

* * * * *